(12) United States Patent
Takamizawa

(10) Patent No.: US 7,257,607 B2
(45) Date of Patent: Aug. 14, 2007

(54) RANDOM NUMBER GENERATING APPARATUS, RANDOM NUMBER GENERATING METHOD, PROGRAM FOR GENERATING RANDOM NUMBERS, AUDIO DECODER AND AUDIO DECODING METHOD

(75) Inventor: Yuichiro Takamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 689 days.

(21) Appl. No.: 10/414,619

(22) Filed: Apr. 16, 2003

(65) Prior Publication Data

US 2003/0200240 A1 Oct. 23, 2003

(30) Foreign Application Priority Data

Apr. 19, 2002 (JP) ............................. 2002-116936

(51) Int. Cl.
*G06F 1/02* (2006.01)
(52) U.S. Cl. .................................... 708/250
(58) Field of Classification Search ................ 708/250, 708/256
See application file for complete search history.

(56) References Cited

U.S. PATENT DOCUMENTS 3,703,727 A * 11/1972 Knowlton .................... 711/217
4,058,673 A * 11/1977 Johansson .................... 380/264
4,791,669 A * 12/1988 Kage ............................ 380/46

FOREIGN PATENT DOCUMENTS

| JP | 61-114326 | 6/1986 |
|---|---|---|
| JP | HEISEI 02-090320 | 3/1990 |
| JP | 2567681 | 10/1996 |
| JP | 2615743 | 3/1997 |
| JP | HEISEI 10-042132 | 2/1998 |
| JP | HEISEI 10-240500 | 9/1998 |
| JP | 2001-127597 | 5/2001 |
| JP | 2002-032732 | 1/2002 |
| JP | 2004-004530 | 1/2004 |

* cited by examiner

*Primary Examiner*—Chuong D. Ngo
(74) *Attorney, Agent, or Firm*—Scully, Scott, Murphy & Presser, P.C.

(57) ABSTRACT

A random number generating apparatus is equipped with a random number memory section in which a plurality of sets of random numbers, whose total energy R, has a fixed value are stored. N random numbers are generated on the basis of more than one set of random numbers read from the random number memory section, and further multiplied by a square root of $(T \times M \div R \div N)$ to obtain a random number sequence having a predetermined energy. A normalization coefficient S can be obtained with a simple process without any usage of the calculation of division and square root multiplication, thereby enabling a small-scale apparatus to be realized. Accordingly, the random number generating apparatus has a decreased scale in the circuit arrangement capable of outputting the random numbers having a predetermined energy.

28 Claims, 7 Drawing Sheets

RANDOM NUMBER GENERATING APPARATUS, RANDOM NUMBER GENERATING METHOD, PROGRAM FOR GENERATING RANDOM NUMBERS, AUDIO DECODER AND AUDIO DECODING METHOD

BACKGROUND OF THE INVENTION

1. Technical Field of the Invention

The present invention relates to a random number generating apparatus, a random number generating method, and a recording medium in which a program for generating random numbers is stored, and more specifically to a random number generating apparatus, a random number generating method, a program for generating random numbers, an audio decoder and an audio decoding method, wherein a random number sequence having a desired energy can be generated with a small-scale apparatus.

2. Description of the Related Art

N random numbers Q(1) to Q(N), whose total energy (square sum) is identical with T, that is, square sum Q(1)×Q(1)+Q(2)×Q(2)+ . . . +Q(N)×Q(N)=T, are required.

Such random numbers are used, for instance, in an audio decoder. In accordance with MPEG-4 AAC (Advanced Audio Coding), which is the international standard of audio signal encoding, the random numbers have a function called PNS (Perceptual Noise Substitute). When the PNS is used, detailed information having a predetermined frequency band is not encoded in an audio encoder, but only the total energy E of the frequency domain signals in the frequency band is encoded. In an audio decoder, white noise (random number) whose energy is identical with the total energy E of the coded signals is used as a frequency domain signal in the frequency band. In the case of generating such a signal, it is required to generate a random number sequence having such a specific energy as in the present invention.

In the present invention, pre-specified random numbers are stored in advance, and then used to generate a random number, as will be later described. Such a prior art, in which the random numbers are stored in advance to generate a random number, is disclosed in, for instance, Japanese Unexamined Patent Publication No. 61-114326, Japanese Patent Publication No. 2615743 and Japanese Patent Publication No. 2567681.

Referring to a block diagram shown in FIG. 1, a general method for generating N random numbers Q(1) to Q(N), whose total energy (square sum) is identical with T, will be described. A generalized random number generating apparatus shown in FIG. 1 comprises a random number generating section 701, an energy calculating section 702 and a random number normalizing section 703. The generalized random number generating apparatus having such a circuit arrangement serves to operate as follows:

The number N of random numbers to be output and an energy value T of the random numbers to be output are input in the random number generating apparatus. The random number generating section 701 generates N normal random numbers Q1(1) to Q1(N) and supplies these normal random numbers to both the energy calculating section 702 and the random number normalizing section 703.

The energy calculating section 702 calculates the total energy P of the random numbers Q1(1) to Q1(N), that is, the square sum Q1(1)×Q1(1)+Q1(2)×Q1(2)+ . . . +Q1(N)×Q1(N)=P, and then supplies the total energy P to the random number normalizing section 703.

In the random number normalizing section 703, a normalization coefficient S is firstly determined by raising (T÷P) to the 0.5 power (i.e., a square root of (T÷P)), and subsequently N random numbers Q(1) to Q(N) are determined in such a manner that the total energy T can be obtained from the Q1(1) to Q(N) multiplied by the normalization coefficient S. Namely, each of the random numbers Q(1) to Q(N) is obtained from the calculation of Q(J)=Q1(J)×S as for J=1 to N. The random numbers Q(1) to Q(N) thus obtained are supplied as final outputs from the random number generating apparatus.

In the above-mentioned prior art, a complexity in the process of the energy calculation and the normalization of the random numbers cause the random number generating apparatus to be increased in the scale. In other words, both a large-scale circuit arrangement and the complicated process increase both the space required for the apparatus and the cost. This is due to the facts that the numeric calculations of division and the square root multiplication are required to obtain the normalization coefficient S.

SUMMARY OF THE INVENTION

Accordingly, it is an object of the present invention to provide a small-scale random number generating apparatus capable of overcoming the above-mentioned problems, in which the technique of generating random numbers in the prior art requires a large-scale random number generating apparatus.

In accordance with a first aspect of the invention, a random number generating apparatus for generating N random numbers, whose square sum has a fixed value T, comprises a random number memory section in which several sets of M (M being a divisor for N) random numbers, whose square sum has a fixed value R, are stored; and a random number amplitude changing section in which N random numbers are produced from more than one set of random numbers read from the random number memory section, and the N random numbers are multiplied by a square root of (T×M÷R÷N).

In accordance with a second aspect of the invention, a random number generating apparatus for generating N random numbers, whose square sum has a fixed value T, comprises a random number memory section in which several sets of M (M being a divisor for N) random numbers, whose square sum has a fixed value R, are stored; a random number sequence changing section in which N random numbers are generated by changing the sequence of the random numbers in more than one set of random numbers read from the random number memory section; a random number polarity changing section for disorderly reversing the polarity of the N random numbers; and a random number amplitude changing section for multiplying the N random numbers by a square root of (T×M÷R÷N).

In accordance with a third aspect of the invention, a random number generating apparatus for generating N random numbers, whose square sum has a fixed value T, comprises a random number memory section in which several sets of M (M being a divisor for N) random numbers, whose square sum has a fixed value R, are stored; a random number sequence changing section in which N random numbers are generated by changing the sequence of the random numbers in more than one set of random numbers read from the random number memory section; and a random number amplitude changing section for multiplying the N random numbers by a square root of (T×M÷R÷N). In accordance with a fourth aspect of the invention, a random number generating apparatus for generating N random numbers whose square sum has a fixed value T, comprises a random number memory section in which several sets of M (M being a divisor for N) random numbers, whose square sum has a fixed value R, are stored; a random number generating section for reading more than one set of random numbers from the random number memory section to generate N random numbers; a random number polarity changing section for disorderly reversing the polarity of the N random numbers; and a random number amplitude changing section for multiplying the N random numbers by a square root of (T×M÷R÷N).

In accordance with a fifth aspect of the invention, the random numbers stored in the random number memory section according to anyone of the above-mentioned random number generating apparatuses are not negative.

In accordance with a sixth aspect of the invention, the random number amplitude changing section in anyone of the above-mentioned random number generating apparatuses determines the square root of (T×M÷R÷N) by means of the table lookup, by regarding T, M and R respectively as a corresponding constant and using a reference figure of N.

In accordance with a seventh aspect of the invention, an audio decoder includes one of the above-mentioned random number generating apparatus; as well as a function for generating noise having a predetermined energy within a predetermined frequency band.

In anyone of the above-mentioned apparatuses, the random number memory section is provided for storing a plurality of sets of random numbers, whose total energy R is identical with a fixed value, and the normalization coefficient S can be obtained with a simple process without any usage of the numerical calculations of division and square root multiplication, so that a small-scale random number generating apparatus can be realized.

In accordance with an eighth aspect of the invention, a random number generating method for generating N random numbers, whose square sum is identical with a fixed value T, comprises the following steps of: storing a plurality of sets of M (M is a divisor for N) random numbers, whose square sum is identical with a fixed value R; reading more than one set of the random numbers; generating N random numbers from the random numbers thus read; and multiplying said N random numbers thus generated by a square root of (T×M÷R÷N).

In accordance with a ninth aspect of the invention, a random number generating method for generating N random numbers, whose square sum is identical with a fixed value T, comprises the following steps of: storing a plurality of sets of M (M is a divisor for N) random numbers, whose square sum is identical with a fixed value R; reading more than one set of the random numbers; generating N random numbers by changing the sequence of the random number thus read; reversing disorderly the polarity of said N random numbers thus generated; and multiplying the N random numbers having the disorderly reversed polarity by a square root of (T×M÷R÷N).

In accordance with a tenth aspect of the invention, a random number generating method for generating N random numbers, whose square sum is identical with a fixed value T, comprises the following steps of: storing a plurality of sets of M (M is a divisor for N) random numbers, whose square sum is identical with a fixed value R; reading more than one set of the random numbers; generating N random numbers by changing the sequence of the random numbers thus read; and multiplying the N random numbers by a square root of (T×M÷R÷N).

In accordance with an eleventh aspect of the invention, a random number generating method for generating N random numbers, whose square sum is identical with a fixed value T, comprises the following steps of: storing a plurality of sets of M (M is a divisor for N) random numbers, whose square sum is identical with a fixed value R; reading more than one set of the random numbers; generating N random numbers from the random numbers thus read; reversing disorderly the polarity of the N random numbers; and multiplying said N random numbers by a square root of (T×M÷R÷N).

In accordance with a twelfth aspect of the invention, the stored random numbers are not negative in anyone of the above-mentioned random number generating methods.

In accordance with a thirteenth aspect of the invention, the square root of (T×M÷R÷N) is determined by means of the table lookup, by regarding T, M and R respectively as a corresponding constant and using a reference figure of N in anyone of the above-mentioned random number generating methods.

In accordance with a fourteenth aspect of the invention, a program for executing one of the above mentioned random number generating methods in one of the above-mentioned random number generating apparatuses.

In accordance with a fifteenth aspect of the invention, an audio decoding method comprises a step of generating noise having a predetermined energy within a predetermined frequency band by utilizing one of the above-mentioned random number generating methods.

DETAILED DESCRIPTION OF THE PREFERRED EMBODIMENTS

Figure 1:
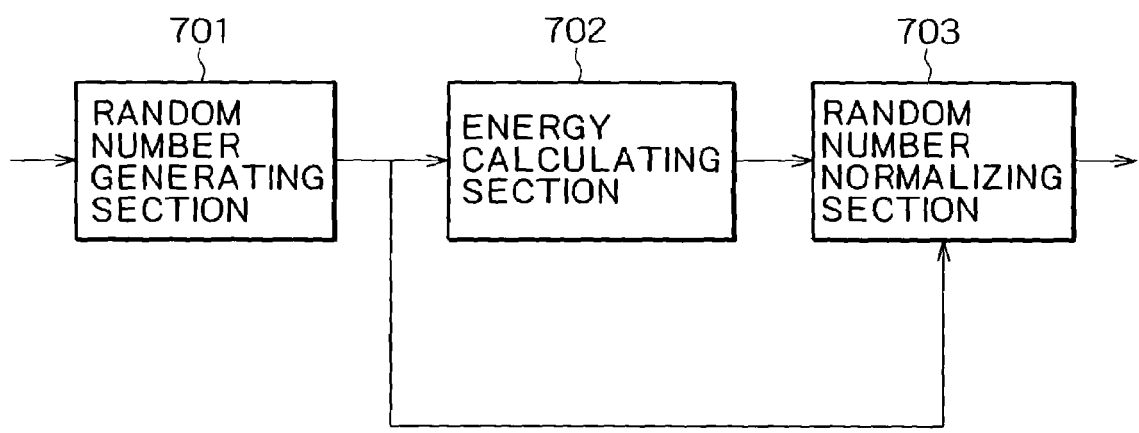
FIG. 1 is a block diagram showing a conventional generalized random number generating apparatus.

Referring now to the drawings, the embodiments of the invention will be described in detail, wherein N random numbers Q(1) to Q(N), whose total energy (the square sum) is identical with T, are generated. In other words, N random numbers Q(1) to Q(N), which provide a square sum of Q(1)×Q(1)+Q(2)×Q(2)+ . . . +Q(N)×Q(N)=T, are generated.

The random number generating apparatus according to the invention is equipped with a random number memory section, in which sets of random numbers providing a constant total energy R, are stored, wherein a normalization coefficient S is determined in a simple process without any usage of the numerical calculation of division and square root multiplication.

Embodiment 1

Figure 2:
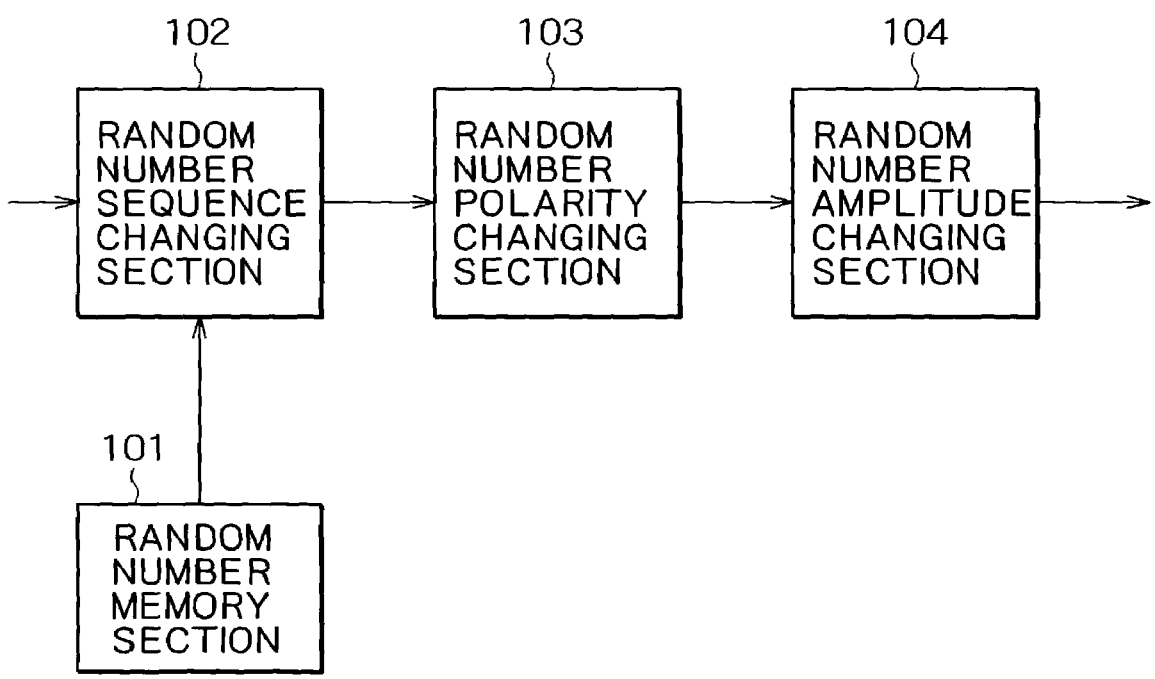
FIG. 2 is a block diagram showing a first embodiment of the invention.

Referring to FIG. 2, the random number generating apparatus in the first embodiment of the invention comprises a random number memory section 101, a random number sequence changing section 102, a random number polarity changing section 103 and a random number amplitude changing section 104. These functional sections 101 to 104 are controlled by a control section (not shown). The random number generating apparatus in the first embodiment of the invention supplies outputs of N random numbers Q(1) to Q(N), whose total energy (the square sum) is identical with T, from the inputs of the number N of the random numbers to be output and the energy T of the random numbers to be output.

The random number memory section 101 stores a plurality of sets of M random numbers, whose square sum calculated in advance is identical with R (the number of the sets is B), and the memory section 101 can be realized, for example, by a semiconductor memory device or the like. It is possible that the random numbers stored beforehand in the random number memory should be positive, negative or zero, or all of the values should to be positive. This is due to the fact that the polarity of each random number can be changed with the aid of the random number polarity changing section 103, as will be later described.

In the random number sequence changing section 102, (N÷M) sets of random numbers are read from the random number memory section 101, and then random numbers Q1(1) to Q1(N) are determined by randomly arranging the N random numbers thus read. As can be seen in the forgoing, it is preferable that M should be a divisor for N. In this case, it is assumed that N random numbers thus read can be randomly arranged. However, the arrangement can also be carried out in the order in which the random numbers are read. Furthermore, the repetition of sets of the random numbers thus read can also be allowed. The random numbers Q1(1) to Q1(N) are supplied to the random number polarity changing section 103.

In the random number polarity changing section 103, the polarity of each of random numbers Q1(1) to Q1(N) is randomly specified. For example, a positive or negative polarity is randomly specified with a probability of ½ to each of the random numbers Q1(1) to Q1(N). The random numbers Q1(1) to Q1(N) each having such a specified polarity is supplied to the random number amplitude changing section 104.

In the random number amplitude changing section 104, random numbers Q(1) to Q(N) are determined by multiplying each of the random numbers Q1(1) to Q1(N) by the normalization coefficient S respectively. In this case, the normalization coefficient S is obtained from a square root of (T×M÷R÷N), and thereby the random numbers Q(1) to Q(N) are determined by the multiplication of Q(J)=Q1(J)×S as for J=1 to N.

Each of the above-described functional sections can be constituted in the form of an individual unit. However, these sections can be formed by one or more digital circuit units including a CPU, RAM and ROM, and the function of each section can be realized by prosecuting an appropriate program.

In order to reduce the scale of the apparatus or to miniaturize the apparatus, it is necessary to simplify the process of calculating the normalization coefficient S. In the first embodiment of the invention, the normalization coefficient S is obtained from the square root of (T×M÷R÷N), as described above. In this case, it is generally assumed that each of the total energy T, the number M of the random numbers in each set stored in the random number memory section 101 and the square sum R of the random numbers in each set are a corresponding constant, respectively. Accordingly, if the normalization coefficients S is calculated in advance for various possible values of N and they are further stored, any normalization coefficient S can be determined from the reference figure of N by means of the table lookup. In the conventional generalized method, the value of P, which is used to obtain the normalization coefficient S, is not an integer and further the range of the value is wide. As a result, it is difficult to obtain the normalization coefficient S from the reference figure of N by means of the table lookup. In the present invention, however, the value of N used as the reference figure is an integer and therefore the range of the values is greatly restricted, thereby enabling the normalization coefficient S to be easily obtained by means of the table lookup.

Figure 3:
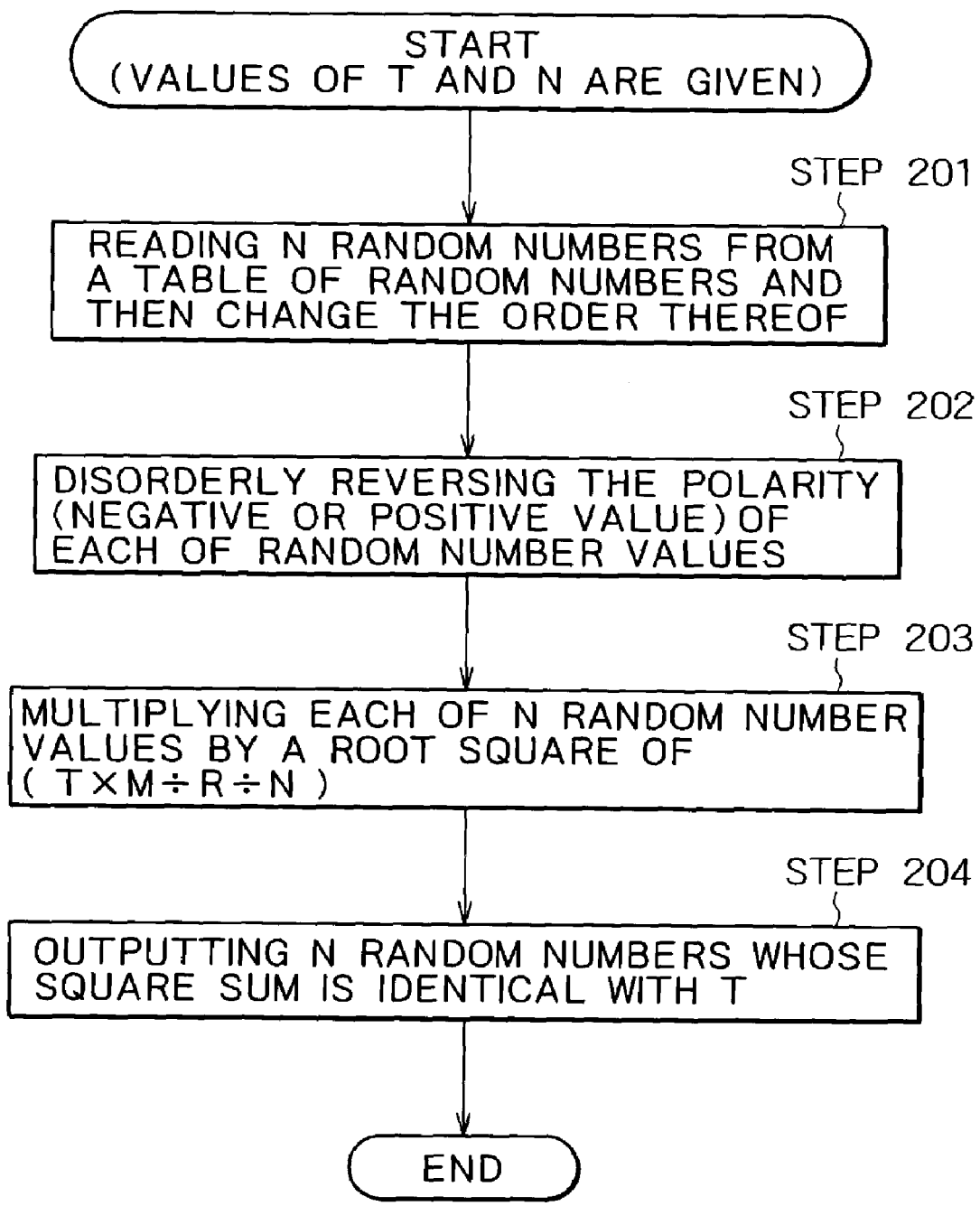
FIG. 3 is a flow chart showing the function of the first embodiment of the invention.

In conjunction with the forgoing, the function obtainable from the first embodiment of the invention will be described, referring to both the block diagram in FIG. 2 and the flow chart in FIG. 3.

In this process, the number N of the random numbers to be output and the energy T of the random number to be output are initially given. In the random number generating apparatus, the total number N of the random numbers are read from a table of random numbers (corresponding to the random number memory section 101 in FIG. 2) and then the sequence of the random numbers is changed (step 201: the function of the random number sequence changing section 102 in FIG. 2). Subsequently, the polarity (negative or positive value) of each element in the random numbers (groups), which are sequentially obtained, is randomly specified (disorderly). In other words, the polarity of each element of the random numbers is disorderly reversed (step 202: the function of the random number polarity changing section 103 in FIG. 2). In addition, the random number, whose polarity is randomly specified, is multiplied by a square root of (T×M÷R÷N) (step 203: the function of the random number amplitude changing section 104 in FIG. 2), so that N random numbers, whose square sum is identical with T, are process and then output (step 204).

In summary, the concept of the present invention is based on the procedure in which a plurality of sets of random numbers having a specified energy are stored in advance, and then a set of random numbers is randomly selected therefrom, and that a random number sequence having a specific energy is determined by changing the amplitude of the random numbers in accordance with the number of sets thus selected, and then the random number sequence thus determined is output. In this case, in order to enhance the degree of disorder in the random number sequence, a process of, so to speak, stirring the random numbers is further carried out within a range of changing no energy by randomly changing the arrangement of the random numbers and/or the polarity of the random numbers. In this case, the required degree of stirring can be changed in accordance with the required degree of disorder in the random numbers. In other words, the following three procedures, i.e., a procedure in which only the arrangement of random numbers is changed without any change of polarity; a procedure in which only the polarity of the random numbers is changed without any change of arrangement; and a procedure in which the arrangement and the polarity of the random numbers are not changed, may be appropriately selected in accordance with the degree of disorder in the random numbers.

In the following, an example of an actual function in the first embodiment of the invention will be described, using concrete numerical values. In this case, as an example, 12 random numbers Q(1) to Q(12), whose total energy is identical with 1.0, is determined. Assumed that 16 sets of four random numbers having a square sum of 1.0 are stored in the random memory section 101. That is, it is assumed that T=1.0, N=12, R=1.0 and M=4, in the above description.

The following 16 sets of four random numbers are stored in the random memory section 101:

| Set 1:  | 0.449178,  | 0.530043,  | −0.343382, | −0.631966 |
|---------|------------|------------|------------|-----------|
| Set 2:  | 0.523504,  | −0.515483, | 0.468504,  | −0.490637 |
| Set 3:  | −0.677804, | −0.575877, | −0.279915, | −0.361380 |
| Set 4:  | −0.612246, | −0.182140, | 0.010700,  | −0.769328 |
| Set 5:  | −0.432675, | 0.461407,  | 0.568505,  | −0.526021 |
| Set 6:  | −0.586134, | −0.565348, | 0.493822,  | 0.304908  |
| Set 7:  | 0.026400,  | 0.564321,  | −0.034952, | −0.824392 |
| Set 8:  | 0.775515,  | 0.228656,  | 0.587243,  | 0.037915  |
| Set 9:  | 0.572206,  | 0.581480,  | −0.013562, | −0.578167 |
| Set 10: | −0.640152, | 0.282552,  | −0.038365, | −0.713371 |
| Set 11: | 0.445407,  | 0.168814,  | −0.800180, | −0.364454 |
| Set 12: | 0.171674,  | 0.343287,  | 0.198769,  | 0.901761  |
| Set 13: | 0.487925,  | −0.799682, | 0.229361,  | 0.264257  |
| Set 14: | −0.165260, | 0.747040,  | 0.064510,  | −0.640671 |
| Set 15: | 0.521080,  | 0.600138,  | 0.049803,  | 0.604839  |
| Set 16: | 0.308102,  | −0.285716, | 0.279905,  | 0.863188  |

In the random number sequence changing section 102, three sets of the random numbers (12 random numbers in total) are randomly read from the random number memory 101 in order to generate N random numbers, i.e., 12 random numbers Q1(1) to Q1(N). In this case, it is assumed that the set 2, the set 5 and the set 14 are sequentially read in a randomly selected order:

| Set 2:  | 0.523504,  | −0.515483, | 0.468504, | −0.490637 |
|---------|------------|------------|-----------|-----------|
| Set 5:  | −0.432675, | 0.461407,  | 0.568505, | −0.526021 |
| Set 14: | −0.165260, | 0.747040,  | 0.064510, | −0.640671 |

Subsequently, 12 random numbers Q1(1) to Q1(12) are produced by disorderly changing the order in the 12 random numbers. In this case, it is assumed that the random numbers Q1(1) to Q1(12) have the following values: These values are output from the random number sequence changing section 102:

Q1(1)=0.468504

Q1(2)=−0.515483

Q1(3)=0.523504

Q1(4)=0.064510

Q1(5)=−0.432675

Q1(6)=0.461407

Q1(7)=−0.526021

Q1(8)=−0.165260

Q1(9)=0.747040

Q1(10)=0.568505

Q1(11)=−0.640671

Q1(12)=−0.490637

In the next stage, i.e., in the random number polarity changing section 103, only the polarity of the random numbers Q1(1) to Q1(12) are randomly specified, and the random numbers Q1(1) to Q1(12), which are obtained by changing the polarity, are supplied to the random number amplitude changing section 104. In this case, it is assumed that the random numbers Q1(1) to Q1(12) provide the following values (only the polarity is randomly changed):

Q1(1)=0.468504

Q1(2)=0.515483

Q1(3)=0.523504

Q1(4)=−0.064510

Q1(5)=−0.432675

Q1(6)=−0.461407

Q1(7)=0.526021

Q1(8)=−0.165260

Q1(9)=−0.747040

Q1(10)=−0.568505

Q1(11)=−0.640671

Q1(12)=0.490637

In the random number amplitude changing section 104, the random numbers Q(1) to Q(12) are determined by multiplying the random numbers Q1(1) to Q1(12) by a normalization coefficient S. In this case, the normalization coefficient S is determined from a square root of (T×M÷R÷N). Since T=1.0, R=1.0 and M=4 are all constants, the normalization coefficient S is determined from a square root of (1.0×4÷1.0÷N), i.e., from a square root of (4÷N). Moreover, N is a positive integer and it resides in a relatively restricted range from 1 to 100 in the general applications. If, therefore, a square root of (4÷N) is calculated for all of the possible values of N and the calculated values are stored in a memory, the normalization coefficient S can be obtained from the reference figure of N by means of the table lookup. In this case, N=12 and therefore the square root of (1÷3), i.e., =0.577350, can be obtained as a normalization coefficient S by means of the table lookup.

By multiplying Q(1) to Q(12) by the normalization coefficient S thus obtained, the following 12 random numbers Q(1) to Q(12), whose total energy is identical with 1.0, can be obtained.

Q(1)=0.270491

Q(2)=0.297614

Q(3)=0.302245

Q(4)=−0.037245

Q(5)=−0.249805

Q(6)=−0.266393

Q(7)=0.303698

Q(8)=−0.095413

Q(9)=−0.431304

Q(10)=−0.328227

Q(11)=−0.369892

Q(12)=0.283269

The advantages resulting from the above-mentioned first embodiment will be described. In the random number generating apparatus of the above-mentioned first embodiment, the random number memory section 101 (FIG. 2) is provided, in which several sets of random numbers are stored, in which case, the random numbers are determined in such a manner that they have a fixed total energy R, and that N random numbers, which are produced on the basis of more than one set of random numbers read from the random memory section, are further multiplied by a square root of (T×M÷R÷N). Thereafter, the random numbers thus obtained are output. As a result, random numbers, whose total energy is identical with a desired value input, can be obtained, using a simple multiplication process, without any usage of such division and square root calculations as required to obtain the normalization coefficient S in the prior art, thereby enabling the scale in the circuit arrangement of the random number generating apparatus to be decreased.

Embodiment 2

Figure 4:
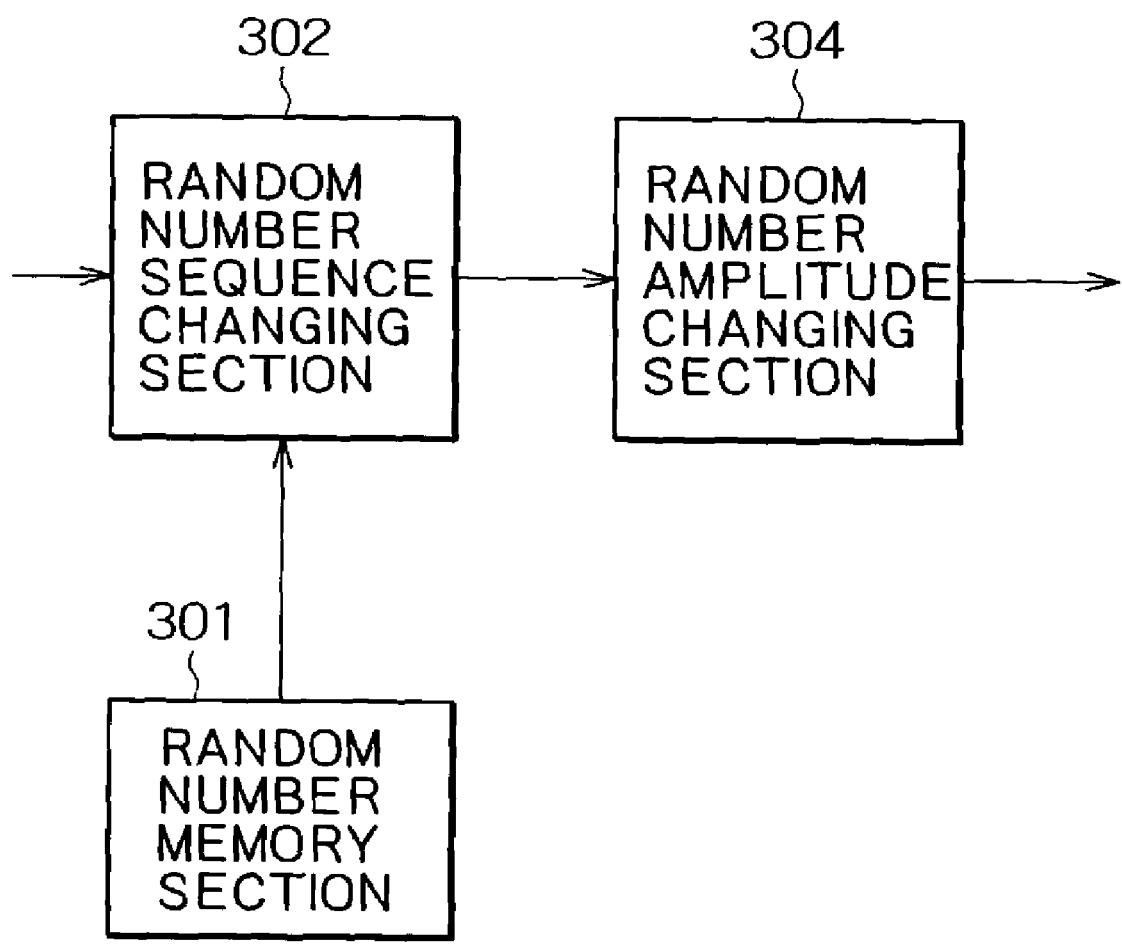
FIG. 4 is a block diagram showing a second embodiment of the invention.

In the following, referring to the block diagram in FIG. 4, the second embodiment of the invention will be described. A random number generating apparatus in the second embodiment of the invention comprises a random number memory section 301, a random number sequence changing section 302 and a random number amplitude changing 304, as shown in FIG. 4. The difference between the first and second embodiments resides in non-provision of the random number polarity changing section 103. That is, the process of randomly changing the polarity of the random numbers is not carried out in the second embodiment of the invention, and the other processes in the second embodiment are the same as those in the first embodiment. In the second embodiment, N random numbers Q(1) to Q(N), whose total energy (square sum) is identical with T, can also be obtained. To avoid the repetition of explanation, the description of individual functional sections is omitted.

Figure 5:
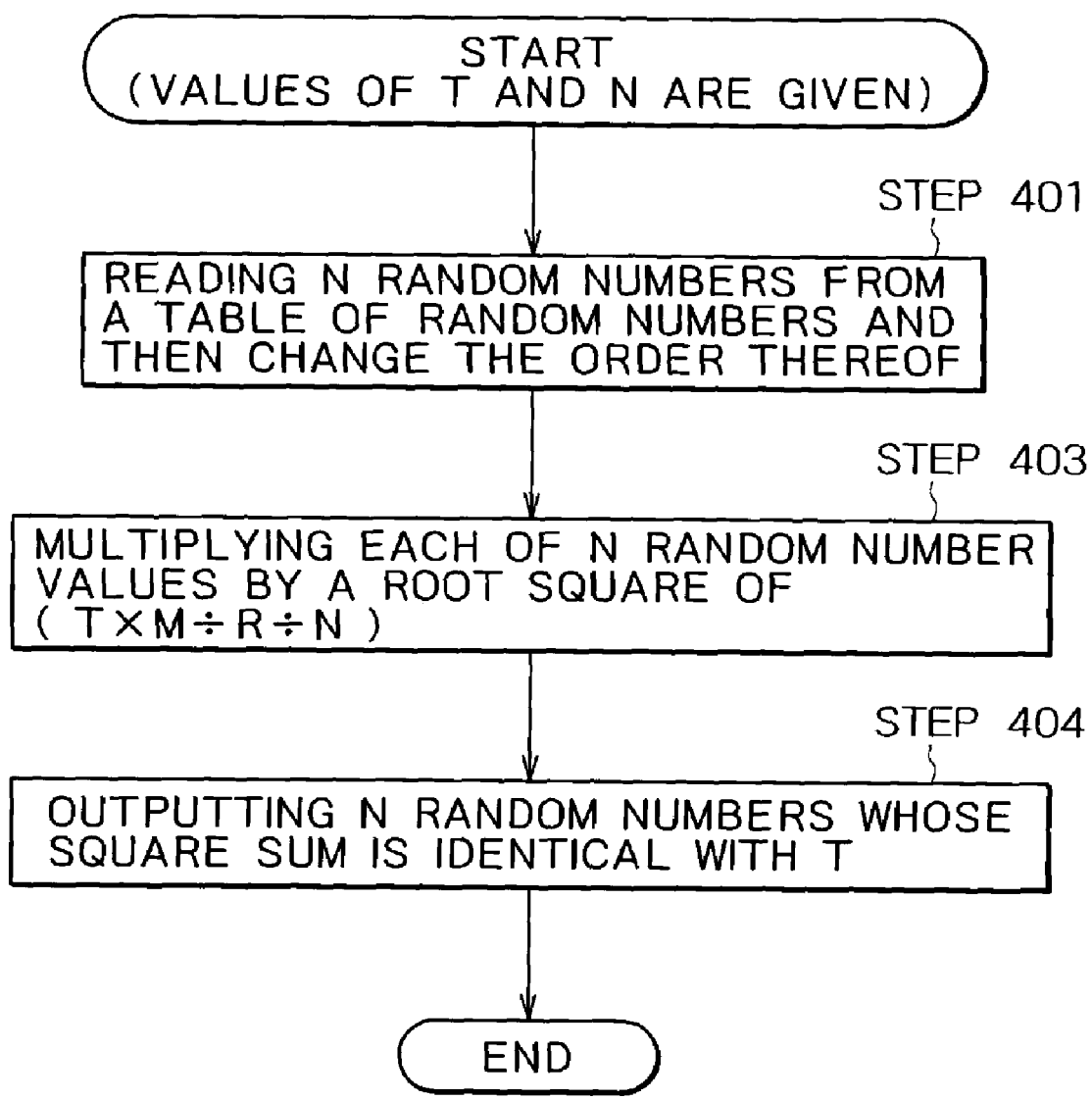
FIG. 5 is a flow chart showing the function of the second embodiment of the invention.

FIG. 5 is the flow chart showing the function of the random number generating apparatus in the second embodiment of the invention. In the process steps, the content of each process in the steps (steps 401, 403 and 404) is the same as that in the first embodiment (FIG. 3); except for the non-provision of step 202 in FIG. 3 where the polarity (negative or positive value) of the random number is randomly changed (disorderly reversed). In the case of the second embodiment, the degree of disorder is decreased, compared with that in the first embodiment, but a reduction in the number of processes causes the scale in the random number generating apparatus to be further decreased.

Embodiment 3

Figure 6:
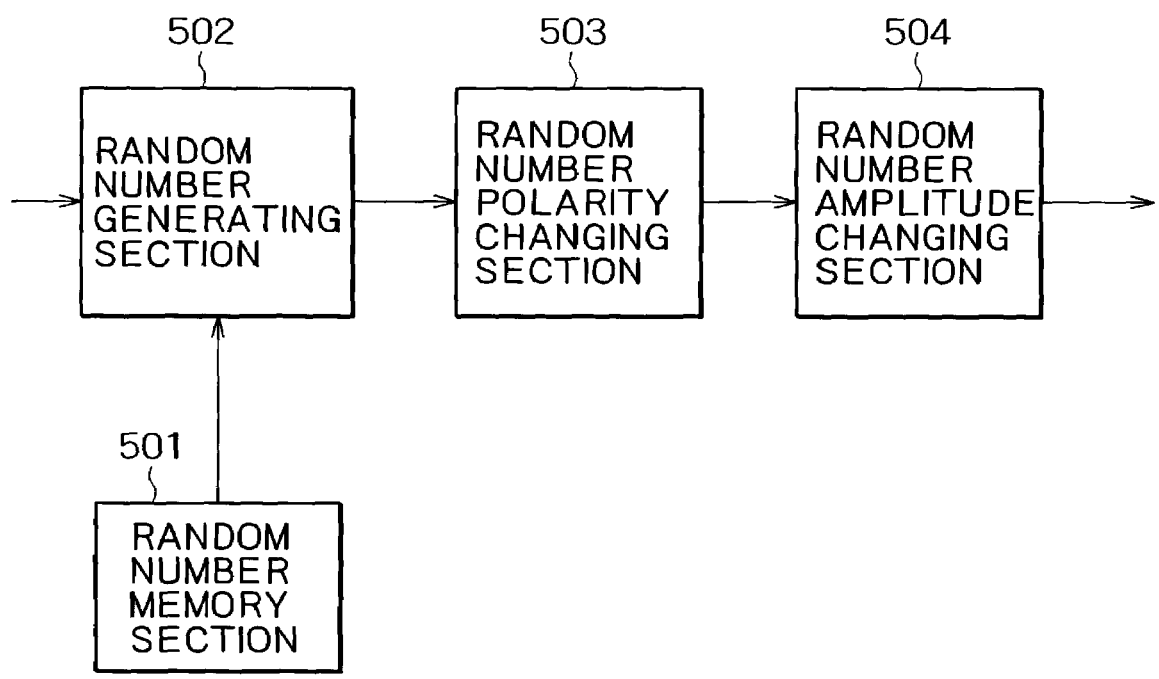
FIG. 6 is a block diagram showing a third embodiment of the invention.

Furthermore, referring to the block diagram in FIG. 6, the third embodiment of the invention will be described. A random number generating apparatus in the third embodiment comprises a random number memory section 501, a random number generating section 502, a random number polarity changing section 503 and a random number amplitude changing section 504, as shown in FIG. 6. The difference between the first and third embodiments resides in the employment of the random number generating section 502, instead of the random number sequence changing section 102. The random number generating section 502 has not only the function of changing the random number sequence. That is, in the third embodiment of the invention, the sequence of the random numbers is not randomly changed, but the random numbers read from the random number memory section 501 are directly used, preserving the same sequence. In the third embodiment, the degree of disorder is decreased, compared with that in the first embodiment, but a reduction in the number of processes causes the scale in the random number generating apparatus to be further decreased. The other processes in the third embodiment are the same as those in the first embodiment.

Figure 7:
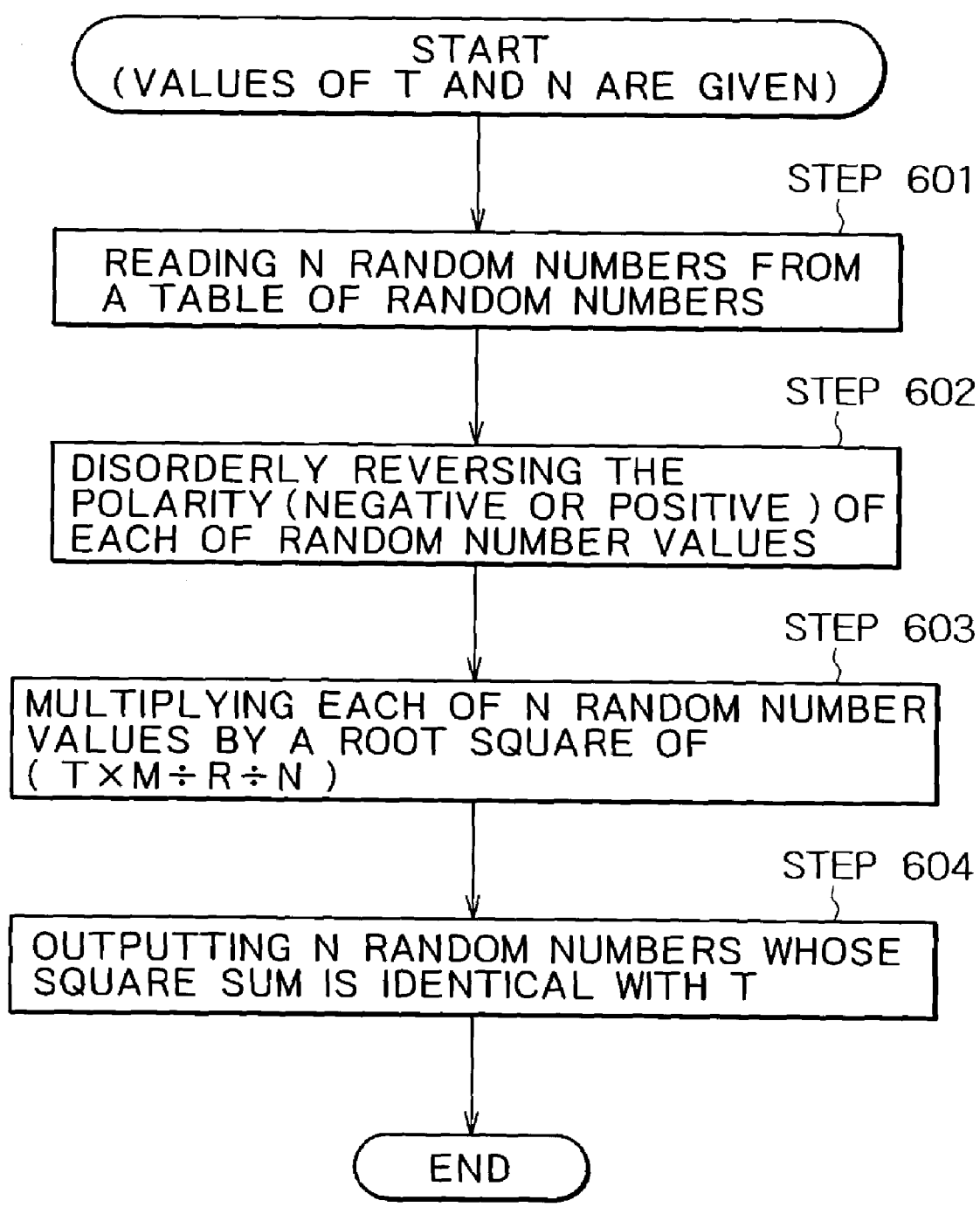
FIG. 7 is a flow chart showing the function of the third embodiment of the invention.

FIG. 7 is the flow chart showing the function of the random number generating apparatus in the third embodiment of the invention. In the case, the content of each process in the steps (steps 602, 603 and 604) is the same as that in the first embodiment (FIG. 3), except for the non-usage of the random number sequence changing process, when comparing step 601 with step 201 in FIG. 3.

As described above, in the second and third embodiments of the invention, the random number generating apparatus is also equipped with the random number memory section (301 in FIG. 4 and 501 in FIG. 6) in which several sets of random numbers whose total energy R is identical with a fixed value are stored, and the random numbers are similarly processed by multiplying N random numbers by a square root of (T×M÷R÷N), wherein the random numbers are produced on the basis of more than one set of random numbers read from the random number memory section. As a result, desired conditions can be attained with only a simple multiplication process, as similarly to the first embodiment, thereby enabling the scale of the random number generating apparatus to be further decreased.

The present invention is not restricted to the above-mentioned embodiments, and therefore can be, of course, realized in the form of an apparatus, which is developed within the scope of the invention. In the exemplified embodiments, the normalization coefficients S to be multiplied are determined in advance in accordance with the value of N, and then stored in a corresponding table, so that each of the coefficients can be obtained from the reference figure of N by means of the table lookup. However, the coefficient can be determined not by means of table lookup, but, for instance, by calculation.

By employing the above-mentioned random number generating apparatus according to the invention, an audio encoder including the above-mentioned PNS function may be produced. Such an audio encoder according to the invention makes it possible to realize the PNS function with a small-scale circuit arrangement, and therefore to miniaturize the total system.

The advantages in the present invention result in the possibility in which the random number sequence having a predetermined energy may be produced with a small-scale apparatus. This is due to the fact that the random number generating apparatus is equipped with the random number memory section (101 in FIG. 2) in which sets of random numbers having a fixed total energy R are stored, and the normalization coefficient S can be obtained with a simple calculation process without execution of both the division and square root calculations.

What is claimed is:

1. An audio decoder apparatus comprising:
a random number generating apparatus for generating N random numbers whose square sum has a fixed value T, comprising:
a random number memory section in which several sets of M (M being a divisor for N) random numbers, whose square sum has a fixed value R are stored; and
a random number amplitude changing section in which N random numbers are produced from more than one set of random numbers read from said random number memory section, and said N random numbers are multiplied by a square root of (T×M÷R÷N); and
means for generating noise having a predetermined energy within a predetermined frequency band using said random number generating apparatus.

2. The audio decoder apparatus according to claim 1, wherein the random numbers stored in said random number memory section are not negative.

3. The audio decoder apparatus according to claim 1, wherein said random number amplitude changing section determines the square root of (T×M÷R÷N) by means of a table lookup, by regarding T, M and R respectively as a corresponding constant and using a reference figure of N.

4. An audio decoder apparatus comprising:
   a random number generating apparatus for generating N random numbers whose square sum has a fixed value T, comprising:
      a random number memory section in which several sets of M (M being a divisor for N) random numbers whose square sum has a fixed value R are stored;
      a random number sequence changing section in which N random numbers are generated by changing the sequence of the random numbers in more than one set of random numbers read from said random number memory section;
      a random number polarity changing section for disorderly reversing the polarity of said N random numbers; and
      a random number amplitude changing section for multiplying said N random number by a square root of (T×M÷R÷N); and
   means for generating noise having a predetermined energy within a predetermined frequency band using said random number generating apparatus.

5. The audio decoder apparatus according to claim 4, wherein the random numbers stored in said random number memory section are not negative.

6. The audio decoder apparatus according to claim 4, wherein said random number amplitude changing section determines the square root of (T×M÷R÷N) by means of a table lookup, by regarding T, M and R respectively as a corresponding constant and using a reference figure of N.

7. An audio decoder apparatus comprising:
   a random number generating apparatus for generating N random numbers whose square sum has a fixed value T, comprising:
      a random number memory section in which several sets of M (M being a divisor for N) random numbers whose square sum has a fixed value R are stored;
      a random number sequence changing section in which N random numbers are generated by changing the sequence of the random numbers in more than one set of random numbers read from said random number memory section; and
      a random number amplitude changing section for multiplying said N random numbers by a square root of (T×M÷R÷N); and
   means for generating noise having a predetermined energy within a predetermined frequency band using said random number generating apparatus.

8. The audio decoder apparatus according to claim 7, wherein the random numbers stored in said random number memory section are not negative.

9. The audio decoder apparatus according to claim 7, wherein said random number amplitude changing section determines the square root of (T×M÷R÷N) by means of a table lookup, by regarding T, M and R respectively as a corresponding constant and using a reference figure of N.

10. An audio decoder apparatus comprising:
    a random number generating apparatus for generating N random numbers whose square sum has a fixed value T, comprising:
       a random number memory section in which several sets of M (M being a divisor of said N) random numbers whose square sum has a fixed value R are stored;
       a random number generating section for reading more than one set of random numbers from said random number memory section to generate N random numbers;
       a random number polarity changing section for disorderly reversing the polarity of said N random numbers; and
       a random number amplitude changing section for multiplying said N random numbers by a square root of (T×M÷R÷N); and
    means for generating noise having a predetermined energy within a predetermined frequency band using said random number generating apparatus.

11. The audio decoder apparatus according to claim 10, wherein the random numbers stored in said random number memory section are not negative.

12. The audio decoder apparatus according to claim 10, wherein said random number amplitude changing section determines the square root of (T×M÷R÷N) by means of a table lookup, by regarding T, M and R respectively as a corresponding constant and using a reference figure of N.

13. An audio decoding method, comprising the steps of:
    generating N random numbers whose square sum has a fixed value of T, said generating comprising the steps of:
       storing a plurality of sets of M (M is a divisor for N) random numbers whose square sum has a fixed value R;
       reading more than one set of said random numbers;
       generating N random numbers from said random numbers thus read; and
       multiplying said N random numbers thus generated by a square root of (T×M÷R÷N); and
    generating noise having a predetermined energy within a predetermined frequency band using said generated N random numbers.

14. The audio decoding method according to claim 13, wherein said stored random numbers are not negative.

15. The audio decoding method according to claim 13, wherein said square root of (T×M÷R÷N) is determined by means of a table lookup, by regarding T, M and R respectively as a corresponding constant and using a reference figure of N.

16. An audio decoding method, comprising the steps of:
    generating N random numbers whose square sum has a fixed value T, said generating comprising the steps of:
       storing a plurality of sets of M (M is a divisor for N) random numbers whose square sum has a fixed value R;
       reading more than one set of said random numbers;
       generating N random numbers by changing the sequence of the random numbers thus read;
       reversing disorderly the polarity of said N random numbers thus generated; and
       multiplying said N random numbers having the disorderly reversed polarity by a square root of (T×M÷R÷N); and
    generating noise having a predetermined energy within a predetermined frequency band using said generated N random numbers.

17. The audio decoding method according to claim 16, wherein said stored random numbers are not negative.

18. The audio decoding method according to claim 16, wherein said square root of (T×M÷R÷N) is determined by means of a table lookup, by regarding T, M and R respectively as a corresponding constant and using a reference figure of N.

19. An audio decoding method, comprising the steps of:
generating N random numbers whose square sum has a fixed value T, said generating comprising the steps of:
storing a plurality of sets of M (M is a divisor for N) random numbers whose square sum has a fixed value R;
reading more than one set of said random numbers;
generating N random numbers by changing the sequence of said random numbers thus read; and
multiplying said N random numbers by a square root of (T×M÷R÷N); and
generating noise having a predetermined energy within a predetermined frequency band using said generated N random numbers.

20. The audio decoding method according to claim 19, wherein said stored random numbers are not negative.

21. The audio decoding method according to claim 19, wherein said square root of (T×M÷R÷N) is determined by means of a table lookup, by regarding T, M and R respectively as a corresponding constant and using a reference figure of N.

22. An audio decoding method, comprising the steps of:
generating N random numbers whose square sum has a fixed value T, said generating comprising the steps of:
storing a plurality of sets of M (M is a divisor for N) random numbers whose square sum has a fixed value R;
reading more than one set of said random numbers;
generating N random numbers from said random numbers thus read;
reversing disorderly the polarity of said N random numbers; and multiplying said N random numbers by a square root of (T×M÷R÷N); and
generating noise having a predetermined energy within a predetermined frequency band using said generated N random numbers.

23. The audio decoding method according to claim 22, wherein said stored random numbers are not negative.

24. The audio decoding method according to claim 22, wherein said square root of (T×M÷R÷N) is determined by means of a table lookup, by regarding T, M and R respectively as a corresponding constant and using a reference figure of N.

25. A computer readable medium having computer readable program for operating on a computer for executing audio decoding, said program comprising instructions that cause the computer to perform the steps of:
generating N random numbers whose square sum has a fixed value of T, said generating comprising the steps of:
storing a plurality of sets of M (M is a divisor for N) random numbers whose square sum has a fixed value R;
reading more than one set of said random numbers;
generating N random numbers from said random numbers thus read; and multiplying said N random numbers thus generated by a square root of (T×M÷R÷N); and
generating noise having a predetermined energy within a predetermined frequency band using the generated N random numbers.

26. A computer readable medium having computer readable program for operating on a computer for executing audio decoding, said program comprising instructions that cause the computer to perform the steps of:
generating N random numbers whose square sum has a fixed value of T, said generating comprising the steps of:
storing a plurality of sets of M (M is a divisor for N) random numbers whose square sum has a fixed value R;
reading more than one set of said random numbers;
generating N random numbers by changing the sequence of the random numbers thus read;
reversing disorderly the polarity of said N random numbers thus generated; and
multiplying said N random numbers having the disorderly reversed polarity by a square root of (T×M÷R÷N); and
generating noise having a predetermined energy within a predetermined frequency band using the generated N random numbers.

27. A computer readable medium having computer readable program for operating on a computer for executing audio decoding, said program comprising instructions that cause the computer to perform the steps of:
generating N random numbers whose square sum has a fixed value of T, said generating comprising the steps of:
storing a plurality of sets of M (M is a divisor for N) random numbers whose square sum has a fixed value R;
reading more than one set of said random numbers;
generating N random numbers by changing the sequence of said random numbers thus read; and
multiplying said N random numbers by a square root of (T×M÷R÷N); and
generating noise having a predetermined energy within a predetermined frequency band using the generated N random numbers.

28. A computer readable medium having computer readable program for operating on a computer for executing audio decoding, said program comprising instructions that cause the computer to perform the steps of:
generating N random numbers whose square sum has a fixed value of T, said generating comprising the steps of:
storing a plurality of sets of M (M is a divisor for N) random numbers whose square sum has a fixed value R;
reading more than one set of said random numbers;
generating N random numbers from said random numbers thus read;
reversing disorderly the polarity of said N random numbers; and
multiplying said N random numbers by a square root of (T×M÷R÷N); and
generating noise having a predetermined energy within a predetermined frequency band using the generated N random numbers.

* * * * *